Figure 1:
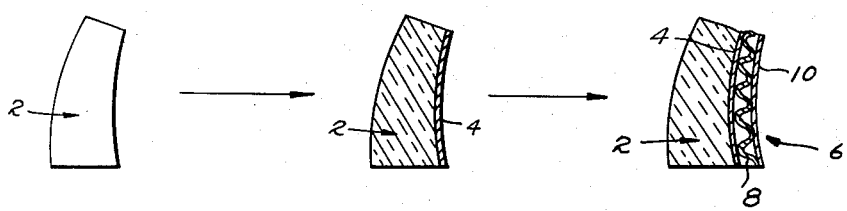

Dec. 17, 1963 E. W. FRIEDRICH 3,114,612
COMPOSITE STRUCTURE
Filed May 15, 1959 2 Sheets-Sheet 1

INVENTOR
EUGENE W. FRIEDRICH

BY Cushman, Darby & Cushman
ATTORNEYS

Dec. 17, 1963          E. W. FRIEDRICH          3,114,612
                       COMPOSITE STRUCTURE
Filed May 15, 1959                           2 Sheets-Sheet 2

INVENTOR
*Eugene W. Friedrich*

BY *Cushman, Darby & Cushman*
ATTORNEYS

United States Patent Office 3,114,612
Patented Dec. 17, 1963

3,114,612
COMPOSITE STRUCTURE
Eugene W. Friedrich, Williamsburg, Va.
(179 Silver Spring Road, Wilton, Conn.)
Filed May 15, 1959, Ser. No. 813,518
1 Claim. (Cl. 29—195)

The present invention relates to a laminated or composite structure comprising at least one metallic member bonded to a ceramic member useful for high temperature applications, combining structural strength with insulation, radiation shielding and the like.

Most metals and other available materials are unsuitable for high temperature applications because of a combination of such disadvantages as low melting point, low oxidation resistance, high thermal conductivity and inadequate high temperature strength. Certain ceramics are free from these disadvantages but they are usually quite brittle and extremely heavy in their dense form. Furthermore, a high temperature cure is normally required to establish the strength characteristics of ceramics prior to use.

The principal object of the present invention is to eliminate the inherent disadvantages of ceramics so that they may be satisfactorily used for high temperature applications, e.g. temperatures of the order of 2000–4000° F., or higher. A more specific object of the invention is to provide a composite metal-ceramic structure combining the advantages of metal, typically stainless steel, and ceramic while at the same time effectively obviating the usual disadvantages of these components. Other objects will also be apparent from the following detailed description of the invention.

Broadly described, the laminated structure of the invention comprises a ceramic layer and a metallic sheet having a non-planar surface including spaced peaks and valleys, the metallic sheet being bonded to the ceramic layer at the spaced peaks by means of a metallic bonding medium having an electrical conductivity greater than that of the metallic sheet. Essentially, the laminate is a structural sandwich having a ceramic as one skin or layer, a core formed by the non-planar configuration of the sheet metal, preferably dimples, and an opposite skin of sheet metal.

The success of the invention is due, to a significant extent, in the use of a metallic bonding medium having an electrical conductivity greater than that of the sheet metal to be bonded to the ceramic. Thus, for example, if the sheet metal is stainless steel (composition 17–7PH, AISI Type 301, 309 or 321) the bonding medium may be low carbon steel C1010, medium carbon steel C1030 or nickel steel AISI Type 2317. This difference in electrical conductivity must be such that the bonding medium is able to draw current flow into itself between two electrodes when the latter are positioned on the adjacent sheet metal as described in greater detail hereinafter. This makes it possible to resistance weld the sheet metal to a face of the ceramic in a highly convenient manner as discussed below.

Another important feature of the invention is that the sheet metal must have a non-planar surface for bonding to the ceramic. The sheet metal may, therefore, comprise corrugated or honeycombed sheet but preferably is dimpled, as indicated heretofore. It has been found that a flat or planar sheet metal surface cannot be effectively bonded to ceramic, for the high temperature applications intended herein, due to the differences which exist in the thermal expansion of the ceramic and sheet metal. Use of the sheet metal having a dimpled, corrugated or otherwise non-planar bonding surface as described herein obviates these thermal expansion problems.

One or more consecutive layers of the dimpled or otherwise non-planar sheet metal may be bonded to the ceramic according to the invention, depending upon the nature and use of the structure desired. Due to the fact that the sheet metal is deformed, optimum strength can be realized using a much thinner gauge thereof than would otherwise be the case. Typically, the sheet metal may have a gauge between .005" and .020" although thicknesses outside this range may also be utilized depending on the use contemplated.

The metal bonding medium may comprise an electrodeposited coating of metal, including alloys. Preferably, however, the medium comprises a metal coating applied by flamespraying onto a surface of the ceramic base. In such event, the coating is composed of metal flakes which are interlocked and partially fused to each other as well as to the ceramic. Such a flame deposited metal bonding medium provides a ductile membrane on the inner face of the ceramic which tends to hold the ceramic in place even if the ceramic should crack in service. The bonding layer also provides a relatively impermeable barrier to gases which might otherwise pass through the porous ceramic to the sheet metal component of the structure.

Instead of flamespraying or otherwise coating the ceramic with bonding metal, the bonding medium may be provided by utilizing a cermet. The cermet may constitute the entire ceramic component or just the surface portion to which the sheet metal is ultimately bonded. For this purpose, any of the conventional cermets may be utilized provided the cermet has a greater conductivity than the sheet metal to be joined thereto as indicated heretofore.

Cermets are refractory compositions which are made by bonding together grains of ceramic with metal. Niobium, tantalum, titanium, iron, chromium, and zirconium may be employed as the metal phase of the cermet. Cermets are normally prepared by powder metallurgy techniques in which a powdered mixture of ceramic refractory, metal and brazing agent is molded to desired form under high pressure and temperature. Typically suitable cermets comprise mixtures of chromium with aluminum silicate; tungsten with beryllium and aluminum oxides; and molybdenum with calcium and aluminum oxides.

As a further alternative, the bonding medium may comprise an appropriate metal bond material, typically low carbon steel suspended on a lattice of suitable flux such as silicate and fluorite and inserted as a sheet between the ceramic component and the dimpled or otherwise non-planar metal sheet. To facilitate bonding according to this aspect of the invention, the ceramic must be electrically conductive or made so by impregnation in a salt bath. The metal sheet and ceramic may be joined together by positioning one electrode on the metal sheet and one on the ceramic and welding by passing current therethrough. When the weld is completed, only a small part of the metal bond material is fused to sheet metal and ceramic and the rest may later be removed by dissolving the lattice of flux material and flushing out.

It will be recognized that the composition of the bonding medium may be varied and depends to a large extent upon the nature of the sheet metal to be bonded to the ceramic. Typically suitable metal bonding mediums, which are capable of being applied by electrodeposition or flamespraying, comprise: low carbon steel, medium carbon steel and nickel steel.

The above noted bonding mediums may be used, with the following specific types of sheet metal: 17–7PH stainless steel, AISI Type 301 stainless steel and AISI Type 321 stainless steel, respectively.

The ceramic should be pre-formed to the desired configuration and fired in usual fashion to attain the needed characteristics before application of the metal sheet thereto. This makes it possible to take advantage of the fabrication flexibility characteristics of the granular ceramic without imposing limitations of the metal, such as low melting temperature.

The ceramic layer may have any desirable thickness and degree of porosity. For ceramics which have a high degree of porosity or large pores, as in the case of foams such as fused quartz, high purity silica, magnesia, or stabilized zirconia foams, a preliminary layer of the same or different ceramic material may be first applied to fill in the voids or pores before the metal bonding medium is applied to the surface thereof which is to be bonded to the sheet metal.

Any type of ceramic may be used for the purpose of the invention. Typically, suitable materials include preformed and fired high purity silica, alumina, stabilized cubic zirconia, magnesia, silicon carbide, silicon nitride, aluminum nitride and mixtures thereof, such as aluminum silicate containing $Al_2O_3$ and silica with minor amounts of $TiO_2$ and iron oxides usually present; zircon ($ZrO_2.SiO_2$); forsterite $2MgO.SiO_2$; and calcined magnesite (85–95% MgO with small amounts of $Fe_2O_3$, CaO, $SiO_2$, etc.).

The ceramic base need not be uniform throughout. Thus, for example, the ceramic may have a composition such that the outer, exposed surface thereof is silicide which phases sequentially into an oxide, then a nitride and finally a cermet at the inner face where the metal sheet is bonded thereto.

The dimpled, corrugated or otherwise non-planar sheet metal layers may be blind welded, without mandrels or other temporary supports, to the metal bonding medium by resistance welding since two electrodes may be placed on the sheet and the electricity will jump over and flow through the more conductive bonding medium. This operation saves time and expense as compared to present fabrication techniques. This use of welding also provides a bond which retains its strength at higher temperatures, as distinguished from the bonds obtained with synthetic adhesives, brazing, soldering, or other bonding methods currently employed.

At the individual weld points, the sprayed metal flakes or the like in the bonding medium are fused more rigidly together and also to the ceramic and corrugated sheet, in this way providing rigid point bonds, or spot contacts. The area of metal bonding layer between these weld bonds remains more flexible to thermal strains than would be the case with cold rolled sheet.

The voids between the corrugations or other projections of the sheet metal, and between the sheet metal and metal bonding layer may be filled with a foam-in-place foam, e.g. high temperature silicone foaming powder or ceramic base foam to additionally stabilize relatively thin gauge sheet metal against local buckling and to provide additional but flexible bond. The voids may also be used for the storage or circulation of cooling liquids or fuel as, for example, in the case of aircraft.

The invention is further described by reference to the attached drawings:

FIGURE 1 illustrates diagrammatically the various fabrication steps involved in carrying out the invention. As shown therein, one face of ceramic member 2 is coated with metallic bonding medium 4; typically low carbon steel, by flamespraying or electrodeposition. The ceramic member may comprise foamed stabilized cubic zirconia prepared by compacting powdered −200+325 sieve 5% calcia stabilized zirconia under heat and pressure (e.g. with phenolic binder at 250° F. and 10,000 p.s.i.) followed by maturing and sintering to around 3000° F., with about one to three hours soaking time.

After application of the metal bonding medium 4, a corrugated sheet metal 6 (typically stainless steel of the following composition: AISI Type 321—cobalt .08 max.; manganese 2.0 max.; silicon 1 max.; phosphorous 0.04 max.; sulfur 0.03 max.; chromium 17–19; nickel 8–11; and titanium 5 x carbon), is welded by sonic or electrical resistance means at the peaks of projections 8 to the coated ceramic base. The outer or exposed surface of the sheet metal member may conform with the corrugated or non-planar surface attached to the ceramic base or an essentially smooth skin 10 may be welded thereto.

FIGURES 2(a)–(d) are diagrammatic views of various laminates in vertical section according to the invention. The laminate of FIGURE 2(a) comprises the ceramic base 2 having a single dimpled sheet 12 resistance welded thereto through the medium 4. The compositions of the ceramic 2, sheet 12 and medium 4 may be the same as indicated with respect to FIGURE 1. However, these may be modified so that the ceramic comprises high purity foamed silica; the sheet AISI Type 301 stainless steel; and the medium nickel steel AISI, Type 2317.

Figure 2A:
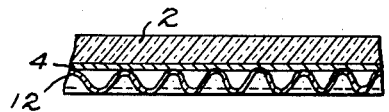
Figure 2B:
Figure 2C:
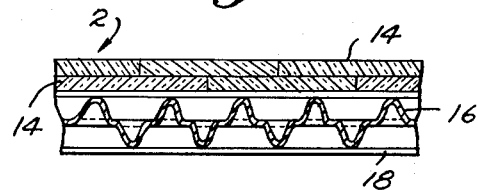
Figure 2D:
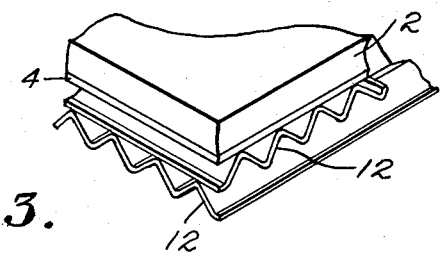

FIGURE 2(b) illustrates a structure wherein two dimpled sheets 12 are joined to the ceramic 2. FIGURE 2(c) shows the use of ceramic comprising tile layers 14 joined to a two-way dimpled sheet 16 having a flat outer skin 18. In FIGURE 2(d), the structure comprises the ceramic base 2 joined to a metal member 20 having perpendicular corrugations 22 and a flat outer skin 24.

Figure 3:
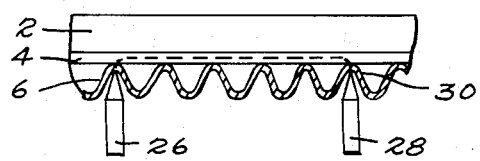

FIGURE 3 shows diagrammatically the blind weld technique which may be used to resistance weld the dimpled sheet 6 or the like to the ceramic base. As shown, a pair of electrodes 26 and 28 are positioned within the projections or dimpled portions 30 of the sheet. Application of current results in current flow, as indicated heretofore, through the bonding medium 4 because of the greater conductivity of the bonding medium compared to that of the sheet metal member 6.

Figure 4:
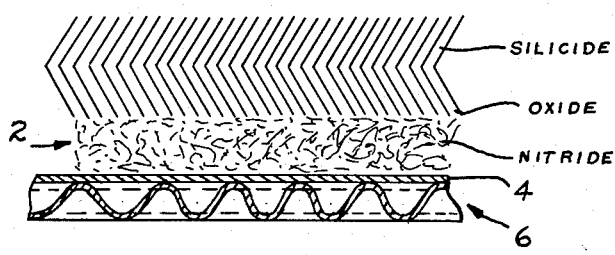

FIGURE 4 is illustrative of a non-uniform ceramic base 2 useful for present invention. As shown, the outer exposed layer of the base comprises a silicide (e.g. of zirconium or other silicide) followed in order by silica or other oxide, silicon nitride or other nitride and cermet or other metal bonding medium 4 at the inner face welded to dimpled sheet 6.

As indicated heretofore, the laminates described herein are useful as insulation materials, radiation shields or the like wherein high temperatures are encountered. Typically these structures may be used in aircraft, missiles, etc., where one surface of the laminate must be exposed to a temperature of 2000° F., or higher while the opposite surface must be maintained at a lower temperature, e.g. 1800° F. or below, over time intervals varying from fractions of a minute to one or more hours either in the transient or steady state. For example, the present structure may be positioned in the leading edge of an airplane wing with the ceramic face exposed and the metal sheet facing inwardly. Liquid may be circulated or stored within the voids created by the dimples, corrugations or projections of the sheet metal as indicated heretofore.

Figure 5:
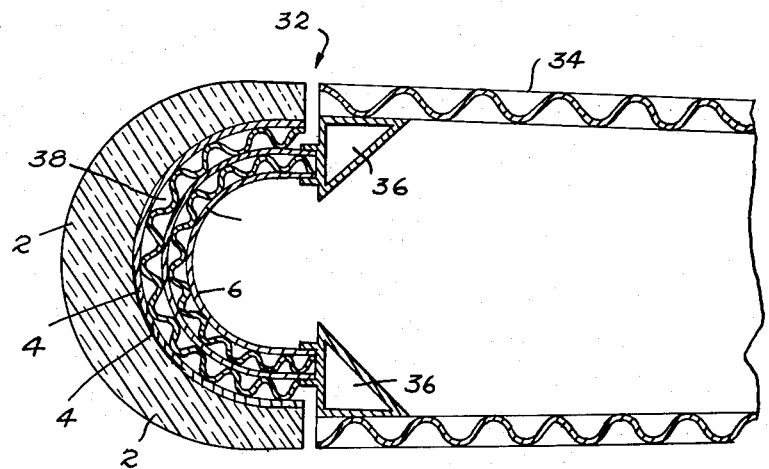

FIGURE 5 is a sectional view showing the laminate or sandwich of the invention attached to the leading edge of an airplane wing 32. As shown, the laminate may be suitably joined to corrugated stainless steel sandwich members 34 through appropriate angle means 36 and the outer sheet member component 6 of the laminate. The voids 38 formed by the dimples in the sheets may be filled with fuel, coolant or otherwise as indicated above. Obviously, the laminate may take other shapes than those indicated herein.

It will be appreciated that the invention as described above offers a number of advantages over prior methods of bonding ceramic to metal sheet. For one thing, a much more effective bond is obtained over a significantly wider temperature range. Additionally, the invention effectively eliminates the necessity for sintering or otherwise after-heating ceramic-metal sheet structure to complete the bond. Accordingly, the metal sheet used herein may have a significantly lower melting point or annealing temperature than hitherto possible. The ability to resistance weld the metal sheet to the ceramic base using electrical or sonic means represents another advantageous feature of the invention.

It will also be recognized that the invention provides an extremely effective way of combining the advantages of ceramics, e.g. low thermal conductivity, high melting point, good oxidation resistance and high strength at elevated temperatures, with the advantages of stainless steels and like metals such as ductility, high strength at relatively low temperature, relative impermeability, moderate cost, etc.

Other advantages and modifications of the invention than those set forth herein will also be apparent. Hence, the scope of the invention is defined in the following claim wherein I claim:

A laminated structure comprising a fired, high temperature ceramic layer, and a stainless steel sheet having a non-planar surface including spaced peaks and valleys, said stainless steel sheet being bonded to a surface of said ceramic layer only at said spaced peaks by a metallic bonding medium having an electrical conductivity greater than that of said stainless steel sheet, said metallic bonding medium comprising a metal coating of steel on said ceramic surface.

References Cited in the file of this patent

UNITED STATES PATENTS

| | | |
|---|---|---|
| 1,900,833 | Maul | Mar. 7, 1933 |
| 1,987,147 | Gross | Jan. 8, 1935 |
| 2,005,897 | Knowles | June 25, 1935 |
| 2,056,563 | Budd | Oct. 6, 1936 |
| 2,196,781 | Saino | Apr. 9, 1940 |
| 2,316,569 | Dornier | Apr. 13, 1943 |
| 2,391,997 | Noble | Jan. 1, 1946 |
| 2,423,870 | Blessing | July 15, 1947 |
| 2,495,835 | Comstock | Jan. 31, 1950 |
| 2,667,432 | Nolte | Jan. 26, 1954 |
| 2,696,622 | Yves le Sech | Dec. 14, 1954 |
| 2,724,177 | Coffman | Nov. 22, 1955 |
| 2,762,116 | Rudner | Sept. 11, 1956 |
| 2,796,157 | Ginsburg | June 18, 1957 |
| 2,858,247 | De Swart | Oct. 28, 1958 |
| 2,963,128 | Rapp | Dec. 6, 1960 |